United States Patent [19]

Motomura et al.

[11] Patent Number: 4,898,617

[45] Date of Patent: Feb. 6, 1990

[54] WORKING MATERIAL FOR CONSTRUCTION OR REPAIR

[75] Inventors: Masatoshi Motomura, Ichihara; Ichiro Muramatsu, Chiba; Noboru Okoshi, Sodegaura; Yoshitami Araki, Kisai; Kenichiro Nomura, Satte; Takehisa Kozai, Kodaira; Hiroshi Mita, Hiroshima, all of Japan

[73] Assignees: Dainippon Ink & Chemicals, Inc.; Taisei Road Construction Co., Ltd., both of Tokyo, Japan

[21] Appl. No.: 250,162

[22] Filed: Sep. 28, 1988

[30] Foreign Application Priority Data

Sep. 28, 1987 [JP] Japan ................................ 62-240885

[51] Int. Cl.$^4$ .............................................. C08L 95/00
[52] U.S. Cl. ............................. 106/281.1; 106/273.1; 106/284.3; 106/232; 106/234; 106/435; 106/229; 106/227
[58] Field of Search ............... 106/273.1, 281.1, 284.3, 106/232, 234, 235, 229, 227

[56] References Cited

U.S. PATENT DOCUMENTS

| | | | |
|---|---|---|---|
| 3,556,827 | 1/1971 | McConnaughay | 106/232 |
| 3,868,263 | 2/1975 | McConnaughay | 106/277 |
| 3,904,428 | 9/1975 | McConnaughay | 106/277 |
| 4,238,536 | 12/1980 | Koch et al. | 106/277 |
| 4,248,749 | 3/1981 | Hayashi et al. | 106/281.1 |
| 4,362,568 | 12/1982 | Ostermeyer | 106/232 |
| 4,453,980 | 6/1984 | Ward | 106/229 |
| 4,676,927 | 6/1987 | Schilling et al. | 106/277 |

Primary Examiner—Paul Lieberman
Assistant Examiner—Helene Klemanski
Attorney, Agent, or Firm—Sherman and Shalloway

[57] ABSTRACT

A working material for construction or repair comprising (A) a mixture of 0.5 to 30% by weight of (a-1) a hydroxide of a divalent or higher basic metal, 10 to 99% by weight of (a-2) an aggregate and 0.5 to 70% of (a-3) a bituminous substance, the total amount of these materials (a-1), (a-2) and (a-3) being 100% by weight, and covering the mixture (A), (C) oxidized rosin or a mixture of (C) oxidized rosin with (D) a compound containing more than one carboxy group per molecule on an average and/or (B) a liquid hydrocarbon or a vegetable oil.

16 Claims, No Drawings

WORKING MATERIAL FOR CONSTRUCTION OR REPAIR

This invention relates to a novel and useful working material for construction or repair. More specifically, this invention relates to various working materials containing a specific chelating component, which are useful for constructing or repairing an asphalt concrete surface or a cement concrete surface.

A primary object of this invention is to provide a working material which can be applied at room temperature to give high strength and sufficient durability.

Another object of this invention is to provide a repairing material which is inexpensive and stable and can repair an asphalt or cement-concrete paved road surface by a simple operation to eliminate potholes or chippings that may cause traffic accidents.

Patching is frequently used to repair broken or chipped parts of asphalt and cement concrete in an emergency case. This is done by a very temporary method of filling asphalt concrete or cement concrete directly in a part to be repaired or by a method involving removing a damaged part and laying a surface layer at that part with a new material.

The former method is used where urgency is required, and generally a hot or cold asphalt mixture is used. The hot asphalt mixture has good adhesion to asphalt paved structures and has excellent durability and stability. But in the wintertime when the temperature is low, this method must be performed after taking a measure for preventing the lowering of the temperature. Accordingly, this method has the defect of difficult handling of the asphalt mixture. On the other hand, the cold asphalt mixture has good applicability but its stability and durability is insufficient for general-purpose applications.

In recent years, various proposals have been made to improve the durability of the cold asphalt mixture. Japanese Patent Publication No. 13601/1984 states that durability is increased by utilizing the thickening effect obtained by the interaction of slaked lime and tall oil. Japanese Laid-Open Patent Publication No. 256864/1987 discloses that durability is increased by the chelating reaction of a hydroxide of a divalent or higher basic metal with a carboxylic acid. Japanese Laid-Open Patent Publication No. 171727/1986 discloses that the use of a specific epoxy resin composition permits exhibition of strength even in an environment kept at a temperature of about 0° C., and greatly improves durability.

The paving material disclosed in the abovecited Japanese Patent Publication No. 13601/1984 has higher stability than a cold asphalt mixture containing cutback asphalt alone but still lower stability than the hot asphalt mixture. The Marshall stability of the paving material at 60° C. is very low or cannot be measured. The stability of the paving material, as is the case with the conventional cold asphalt mixture, is evaluated by a Marshall stability test at room temperature. This is because the temperature susceptibility of cutback asphalt is high and its stability decreases with a rise in temperature.

The working material disclosed in Japanese Laid-Open Patent Publication No. 256864/1987 contains a polycarboxylic acid such as a polyester polycarboxylic acid or dimeric acid, a synthetic substance, and requires more steps and time for synthesis than the material shown in Japanese Patent Publication No. 13601/1984 which contains tall oil obtained by purifying a naturally occurring material. Hence, it is higher in cost and its storage stability is low.

The working material disclosed in Japanese Laid-Open Patent Publication No. 171727/1986 has sufficient durability but is expensive. Moreover, since the working material is of a multi-liquid mix type, its workability is poor.

In view of the above state of the art, the present inventors made extensive investigations in order to develop a construction or repairing material which can be stored for more than three months at room temperature and easily applied at room temperature, can give stability and durability equivalent to, or higher than, conventional hot asphalt mixtures, is inexpensive, and moreover permits traffic use of the constructed or repaired part at an early time in a perfect condition. These investigations have led to the discovery of a working material which shows a marked improvement in "stability" or "storability" (storage stability) represented, for example, by the Marshall stability mentioned above as a result of utilizing a chelating reaction between a hydroxide of a divalent or higher basic metal and oxidized rosin and a specific carboxyl-containing compound.

Thus, according to this invention, there is provided a working material for construction or repair comprising (A) a mixture of 0.5 to 30% by weight of (a-1) a hydroxide of a divalent or higher basic metal, 10 to 99% by weight of (a-2) an aggregate and 0.5 to 70% of (a-3) a bituminous substance, the total amount of these materials (a-1), (a-2) and (a-3) being 100% by weight, and covering the mixture, (C) oxidized rosin or a mixture of (C) oxidized rosin and (B) a liquid hydrocarbon or a vegetable oil.

The present invention also provides a working material for construction or repair comprising (A) a mixture of 0.5 to 30% by weight of (a-1) a hydroxide of a divalent or higher basic metal, 10 to 99% by weight of (a-2) an aggregate and 0.5 to 70% of (a-3) a bituminous substance, the total amount of these materials (a-1), (a-2) and (a-3) being 100% by weight, and covering the mixture, a mixture of (C) oxidized rosin and (D) a compound containing more than one carboxyl group per molecule on an average, or a mixture of (C) oxidized rosin, (B) a liquid hydrocarbon or a vegetable oil and (D) a compound containing more than one carboxyl group per molecule on an average.

The hydroxide (a-1) of a divalent or higher basic metal denotes a metal hydroxide which performs a chelating reaction with a carboxyl-containing compound such as oxidized rosin. Typical examples are calcium hydroxide, zinc hydroxide, magnesium hydroxide and aluminum hydroxide.

The aggregate (a-2) generically denotes natural or artificial coarse aggregates and fine aggregates or stone powder.

The bituminous substance (a-3) generically denotes asphalt and cutback asphalt. The cutback asphalt denotes a product obtained by softening asphalt with various liquid hydrocarbons such as heavy oils, light oils, kerosene, gasoline and engine oils, or vegetable oil.

Typical examples of the liquid hydrocarbon or vegetable oil (B) are heavy oils, light oils, kerosene, gasoline, engine oils, castor oil, and linseed oil.

The oxidized rosin (C) denotes products obtained by auto-oxidation of powders of various rosins containing unsaturated acids having abietic acid-type double bonds, or products obtained by oxidizing the powders of the rosins by blowing air into a reactor. Oxidation of the rosin increases its polarity and its solubility in the cutback asphalt decreases. Consequently, during or after the coating of the above mixture (A) with the oxidized rosin (C) or a mixture of the oxidized rosin (C) and the compound (D) containing more than one carboxyl group per molecule on an average, chelating reaction between the metal hydroxide (a-1) and the oxidized rosin (C) or between the metal hydroxide (a-1) and the oxidized rosin (C) and the compound (D) is inhibited effectively by the layer of the cutback asphalt. Accordingly, chelating reaction does not easily occur at the time of coating the mixture (A) with the oxidized rosin (C) or a mixture of the oxidized rosin (C) and the compound (D). Hence, the working material does not thicken nor solidifies, and the coated working material is stable.

Typical examples of the compound (D) containing more than one carboxyl group per molecule on an average to be referred to as the polycarboxylic acid (D)) include (1) polycarboxylic acids such as succinic acid, adipic acid, isophthalic acid, terephthalic acid and trimellitic acid; (2) carboxyl-terminated polyesters obtained by esterification reaction in a customary manner of polycarboxylic acid anhydrides such as anhydrides of the above-exemplified polycarboxylic acids, maleic anhydride and phthalic anhydride with polyhydric alcohols such as ethylene glycol, propylene glycol, diethylene glycol, dipropylene glycol, 1,3-butanediol, 1,4-butanediol, neopentyl glycol, 1,6-hexanediol, trimethylolpropane, pentaerythritol or dipentaerythritol, adducts of these polyhydric alcohols with ethylene oxide or propylene oxide, or monoglycerides obtained by the ester-interchange reaction of various oils and fats with the polyhydric alcohols exemplified above; and (3) so-called dimeric acids derived from fatty acids in a customary manner through a Diels-Alder reaction.

As required, monocarboxylic acids may be used together with the polycarboxylic acids (D).

The definition "compound having more than one carboxyl group per molecule on an average" is given to the polycarboxylic acid (D). This means that a compound having not more than one carboxyl group per molecule (i.e., monocarboxylic acid) or a carboxylic acid having less than one carboxyl group per molecule such as tall oil fatty acid cannot be increased in molecular weight by the chelating reaction with the divalent or higher basic metal hydroxide (a-1).

The working material of this invention may be prepared by the following procedure. First, as essential ingredients, 0.5 to 30% by weight, preferably 1 to 20% by weight, more preferably 3 to 15% by weight, of the metal hydroxide (a-1), 10 to 99% by weight, preferably 60 to 95% by weight, more preferably 80 to 92% by weight, of the aggregate (a-2) and 0.5 to 70% by weight, preferably 0.5 to 30%, more preferably 1 to 15% by weight, of the bituminous substance (a-3), the total of the proportions of (a-1), (a-2) and (a-3) being 100% by weight, are mixed to form a mixture (A). Then, a mixture of 0 to 20 parts by weight, preferably 0 to 15 parts by weight, of the liquid hydrocarbon or vegetable oil (B) and 0.01 to 20 parts by weight, preferably 0.05 to 15 parts by weight, of the oxidized rosin (C), or a mixture of 0 to 20 parts by weight, preferably 0 to 15 parts by weight, of the liquid hydrocarbon or vegetable oil (B), 0.01 to 20 parts by weight, preferably 0.05 to 15 parts by weight of the oxidized rosin (C), and 0.01 to 20 parts by weight, preferably 0.05 to 15 parts by weight, of the polycarboxylic acid (D), is added to 100 parts by weight of the mixture (A). Consequently, the mixture (A) is coated with either the oxidized rosin (C), the oxidized rosin (C) and the polycarboxylic acid (D), or the liquid hydrocarbon or vegetable oil (B) and the oxidized rosin (C), or with the liquid hydrocarbon or vegetable oil (B), the oxidized rosin (C) and the polycarboxylic acid (D).

The total amount of the oxidized rosin (C) and the polycarboxylic acid (D), when used together, is 0.5 to 20 parts by weight, preferably 0.5 to 15 parts by weight, per 100 parts by weight of the mixture (A).

In the preparation of the working material of this invention, slag, a coloring material, a rubbery elastomeric material or various fillers such as calcium carbonate, or various organic amine compounds for neutralizing the carboxylic acids in the oxidized rosin (C) and the polycarboxylic acid (D) may be used together as desired. It is also possible to use various organic solvents or diluents together with the oxidized rosin (C) or the polycarboxylic acid (D).

A coloring agent such as red iron oxide may be included in the working material of this invention.

The working material of this invention may be used to construct or repair asphalt concrete or cement concrete surfaces, particularly paved road surfaces and floor surfaces or road surfaces of various architectural or building structures such as bridges, parks, parking lots and factory buildings.

When the working material is used to construct new concrete surfaces, it is possible to create natural aesthetic beauty by artificially combining natural aggregates with a coloring material or to apply it to parts which require dust prevention. Hence, the working material of this invention is very useful.

The following Referential Examples, Examples and Comparative Examples illustrate the present invention more specifically. All percentages in the following examples are by weight unless otherwise specified.

REFERENTIAL EXAMPLE 1

Preparation of oxidized rosin (C)

Gum rosin occurring in China (100 kg) and 1 kg of cobalt naphthenate were fed into a vessel equipped with a stirrer, a thermometer, a condenser and an air bowing device, and heated to 120° C. Air was then blown into the vessel at a flow rate of 50 liters/min. for 10 hours. During this time, n-heptane was added to 5 g of the contents of the vessel (spot test), and the point of time at which an insoluble material formed was determined to be an end point of oxidation. The product was recovered when the amount of n-heptane reached 30 g. This product is designated as oxidized rosin (C-1).

REFERENTIAL EXAMPLE 2

Preparation of oxidized rosin (C)

Gum rosin occurring in Indonesia (100 kg) and 1 kg of cobalt naphthenate were fed into a vessel equipped with a stirrer, a thermometer, a condenser and an air blowing device, and heated to 120° C. Air was then blown into the vessel at a flow rate of 50 liters/min. for 10 hours. The product was recovered when the amount of n-heptane in the spot test reached 30 g. This product is designated as oxidized rosin (C-2).

REFERENTIAL EXAMPLE 3

Preparation of aggregate (a-2)

Composite aggregate was prepared in accordance with the formulation shown in Table 1.

TABLE 1

| Type | Proportion (%) |
|---|---|
| Crushed stone with a particle diameter of 13 to 5 mm | 37 |
| Crushed stone with a particle diameter of 5 to 2.5 mm | 18 |
| Sand | 45 |

The product is designated as aggregate (a-2-1).

REFERENTIAL EXAMPLES 4-9

Preparation of coating materials

Coating materials were prepared from oxidized rosins (C-1) and (C-2), dimeric acid (D) and heavy oil (B) in accordance with the formulations shown in Table 2.

TABLE 2

| Component | Referential Example | | | | | |
|---|---|---|---|---|---|---|
| | 4 | 5 | 6 | 7 | 8 | 9 |
| Oxidized rosin (C-1) | 100 | 50 | | | | |
| Oxidized rosin (C-2) | | | 100 | 40 | 34 | 30 |
| Dimeric acid (D) | | | | | 6 | 30 |
| Heavy oil (B) | | 50 | | 60 | 60 | 40 |
| Designation of the coating material | I | II | III | IV | V | VI |

EXAMPLES 1-6 AND COMPARATIVE EXAMPLES 1-2

As shown in Table 3, 86.8% of aggregate (a-2-1) and 7.5% of calcium hydroxide were mixed, and further with 2.85% of cutback asphalt. Then, 2.85% of each of the coating materials obtained in Referential Examples 4 to 9 was added and mixed to give a working material in accordance with this invention.

The resulting mixture (working material) was stored at room temperature. After 1, 7, 28 and 56 days respectively, the mixture was sampled, and compacted by 50 blows on both surfaces at 20° C. The testing samples so prepared were tested for residual stability to valuate 60° C. Marshall stability and water resistance by the methods shown in Asphalt Paving Guidelines. The results are summarized in Table 3.

For comparison, the same test was carried out for a hot asphalt mixture and a cold asphalt mixture containing only cutback asphalt. The results are also shown in Table 3.

TABLE 3

| | Coating material designation | Period of storage (days) | Immersed in water at 60° C. for 30 minutes | | Immersed in water at 60° C. for 48 minutes | | Residual stability % $\left(\dfrac{b}{a} \times 100\right)$ |
|---|---|---|---|---|---|---|---|
| | | | Marshall stability (a) (kg) | Marshall flow value (cm) | Marshall stability (b) (cm) | Marshall flow value (cm) | |
| Example | | | | | | | |
| 1 | I | 1 | 430 | 29 | 910 | 23 | 212 |
| | | 7 | 420 | 27 | 960 | 24 | 229 |
| | | 28 | 410 | 27 | 1020 | 26 | 249 |
| | | 56 | 430 | 28 | 990 | 25 | 230 |
| 2 | II | 1 | 460 | 28 | 870 | 24 | 189 |
| | | 7 | 460 | 27 | 850 | 23 | 185 |
| | | 28 | 450 | 29 | 890 | 26 | 198 |
| | | 56 | 420 | 27 | 850 | 24 | 202 |
| 3 | III | 1 | 410 | 30 | 1020 | 30 | 249 |
| | | 7 | 410 | 32 | 1080 | 30 | 263 |
| | | 28 | 420 | 34 | 1000 | 28 | 238 |
| | | 56 | 400 | 33 | 960 | 27 | 240 |
| 4 | IV | 1 | 320 | 30 | 1060 | 27 | 331 |
| | | 7 | 310 | 31 | 1100 | 30 | 323 |
| | | 28 | 330 | 29 | 1050 | 31 | 318 |
| | | 56 | 300 | 27 | 1090 | 29 | 363 |
| 5 | V | 1 | 360 | 33 | 1200 | 30 | 333 |
| | | 7 | 360 | 32 | 1250 | 29 | 347 |
| | | 28 | 330 | 30 | 1180 | 29 | 358 |
| | | 56 | 320 | 31 | 1200 | 31 | 375 |
| 6 | VI | 1 | 600 | 35 | 1600 | 34 | 267 |
| | | 7 | 630 | 33 | 1570 | 30 | 249 |
| | | 28 | 590 | 34 | 1520 | 29 | 258 |
| | | 56 | 550 | 34 | 1550 | 32 | 282 |
| Comparative Example | | | | | | | |
| 1 | Hot asphalt mixture | | 960 | 28 | 860 | 31 | 89.6 |
| 2 | Conventional cold asphalt mixture | | Measurement impossible | | Measurement impossible | | — |

The results shown in Table 3 demonstrate that the working material of this invention, quite unlike the conventional cold asphalt mixture, can be stored for more than one month and applied at room temperature, and that after application, has stability and water resistance equivalent to, or higher than, those of the hot asphalt mixture.

We claim:

1. A working material for construction or repair comprising (A) a mixture of 0.5 to 30% by weight of (a-1) a hydroxide of a divalent or higher basic metal, 10 to 99% by weight of (a-2) an aggregate and 0.5 to 70% of (a-3) a bituminous substance, the total amount of these materials (a-1), (a-2) and (a-3) being 100% by weight, and covering the mixture (A), (C) oxidized rosin whereby a chelating reaction between the metal hydroxide (a-1) in mixture (A) and the oxidized rosin (C) is effectively inhibited.

2. A working material for construction or repair comprising (A) a mixture of 0.5 to 30% by weight of (a-1) a hydroxide of a divalent or higher basic metal, 10 to 99% by weight of (a-2) an aggregate and 0.5 to 70% of (a-3) a bituminous substance, the total amount of these materials (a-1), (a-2) and (a-3) being 100% by weight, and covering the mixture (A), a mixture of (B) a liquid hydrocarbon or a vegetable oil and (C) oxidized rosin whereby a chelating reaction between the metal hydroxide (a-1) in mixture (A) and the oxidized rosin (C) is effectively inhibited.

3. A working material for construction or repair comprising (A) a mixture of 0.5 to 30% by weight of (a-1) a hydroxide of a divalent or higher basic metal, 10 to 99% by weight of (a-2) an aggregate and 0.5 to 70% of (a-3) a bituminous substance, the total amount of these materials (a-1), (a-2) and (a-3) being 100% by weight, and covering the mixture (A), a mixture of (C) oxidized rosin and (D) a compound having more than one carboxyl group per molecule on an average whereby a chelating reaction between the metal hydroxide (a-1) in mixture (A) and the oxidized rosin (C) or compound (D) is effectively inhibited.

4. A working material for construction or repair comprising (A) a mixture of 0.5 to 30% by weight of (a-1) a hydroxide of a divalent or higher basic metal, 10 to 99% by weight of (a-2) an aggregate and 0.5 to 70% of (a-3) a bituminous substance, the total amount of these materials (a-1), (a-2) and (a-3) being 100% by weight, and covering the mixture (A) a mixture of (B) a liquid hydrocarbon or a vegetable oil, (C) oxidized rosin and (D) a compound having more than one carboxyl group permolecule on an average whereby a chelating reaction between the metal hydroxide (a-1) in mixture (A) and the oxidized rosin (C) or compound (D) is effectively inhibited.

5. The working material of claim 1 wherein the mixture (A) includes 1 to 20% by weight of the metal hydroxide (a-1), 60 to 95% by weight of the aggregate (a-2) and 0.5 to 30% by weight of the bituminous substance (a-3), the total of the proportions of (a-1), (a-2) and (a-3) being 100% by weight.

6. The working material of claim 2 wherein the mixture (A) includes 1 to 20% by weight of the metal hydroxide (a-1), 60 to 95% by weight of the aggregate (a-2) and 0.5 to 30% by weight of the bituminous substance (a-3), the total of the proportions of (a-1), (a-2) and (a-3) being 100% by weight.

7. The working material of claim 3 wherein the mixture (A) includes 1 to 20% by weight of the metal hydroxide (a-1), 60 to 95% by weight of the aggregate (a-2) and 0.5 to 30% by weight o the bituminous substance (a-3), the total of the proportions of (a-1), (a-2) and (a-3) being 100% by weight.

8. The working material of claim 4 wherein the mixture (A) includes 1 to 20% by weight of the metal hydroxide (a-1), 60 to 95% by weight of the aggregate (a-2) and 0.5 to 30% by weight of the bituminous substance (a-3), the total of the proportions of (a-1), (a-2) and (a-3) being 100% by weight.

9. The working material of claim 1 wherein the mixture (A) includes 3 to 15% by weight of the metal hydroxide (a-1), 80 to 92% by weight of the aggregate (a-2) and 1 to 15% by weight of the bituminous substances (a-3), the total of the proportions of (a-1), (a-2) and (a-3) being 100% by weight.

10. The working material of claim 2 wherein the mixture (A) includes 3 to 15% by weight of the metal hydroxide (a-1), 80 to 92% by weight of the aggregate (a-2) and 1 to 15% by weight of the bituminous substance (a-3), the total of the proportions of (a-1), (a-2) and (a-3) being 100% by weight.

11. The working material of claim 3 wherein the mixture (A) includes 3 to 15% by weight of the metal hydroxide (a-1), 80 to 92% by weight of the aggregate (a-2) and 1 to 15% by weight of the bituminous substances (a-3), the total of the proportions of (a-1), (a-2) and (a-3) being 100% by weight.

12. The working material of claim 4 wherein the mixture (A) includes 3 to 15% by weight of the metal hydroxide (a-1), 80 to 92% by weight of the aggregate (a-2) and 1 to 15% by weight of the bituminous substance (a-3), the total of the proportions of (a-1), (a-2) and (a-3) being 100% by weight.

13. The working material of claim 1 wherein the amount of the oxidized rosin (C) is from 0.01 to 20 parts by weight per 100 parts by weight of the mixture (A).

14. The working material of claim 2 wherein said mixture covering the mixture (A) comprises up to 15 parts by weight by (B) and from 0.01 to 20 parts by weight of the oxidized rosin (C), per 100 parts of the mixture (A).

15. The working material of claim 3 wherein the mixture covering the mixture (A) comprises from 0.01 to 20 parts by weight of the oxidized rosin (C) and from 0 01 to 20 parts by weight of the compound (D), the total amount of the oxidized rosin (C) and compound (D) being from 0.5 to 20 parts by weight, 100 parts by weight of the mixture (A).

16. The working material of claim 4 wherein mixture covering the mixture (A) comprises up to 15 parts by weight of the liquid hydrocarbon or vegetable oil (B), from 0.05 to 15 parts by weight of the oxidized rosin (C) and from 0.05 to 15 parts by weight of the compound (D), per 100 parts by weight of the mixture (A).

* * * * *

UNITED STATES PATENT AND TRADEMARK OFFICE
CERTIFICATE OF CORRECTION

PATENT NO. : 4,898,617
DATED : February 6, 1990
INVENTOR(S) : MASATOSHI MOTOMURA ET AL.

It is certified that error appears in the above-identified patent and that said Letters Patent is hereby corrected as shown below:

On the cover page, in the Abstract, line 9 of the Abstract, "carboxy" should read --carboxyl--.

Claim 4, line 10 of the claim, "permolecule" should read --per molecule--.

Claim 7, line 4 of the claim, "o" should read --of--.

Claim 9, lines 4 and 5 of the claim, "substances" should read --substance--.

Claim 11, lines 4 and 5, "substances" should read --substance--.

Claim 15, line 4 of the claim, "0 01" should read --0.01--.

Signed and Sealed this

Fifth Day of March, 1991

Attest:

HARRY F. MANBECK, JR.

*Attesting Officer*  *Commissioner of Patents and Trademarks*